Patented Jan. 9, 1951

2,537,282

UNITED STATES PATENT OFFICE 2,537,282

TREATMENT OF HYDROCARBONS

Raymond E. Schaad, Riverside, Ill., assignor to Universal Oil Products Company, Chicago, Ill., a corporation of Delaware No Drawing. Application October 26, 1946, Serial No. 706,057

16 Claims. (Cl. 260—671)

This invention relates to the treatment of hydrocarbons in the presence of a particular type of catalyst to produce branched chain organic compounds, particularly branched chain hydrocarbons. The reactions to which the invention refers involve particularly polymerization of unsaturated hydrocarbons including olefins, diolefins, cycloolefins, and terpenes; the isomerization of olefinic hydrocarbons; hydrogen transfer reactions among olefinic hydrocarbons; cracking of paraffins and naphthenes; cracking and depolymerization of olefins; amination of olefins and alkylation with olefinic hydrocarbons and other olefin-acting compounds of aromatic compounds including aromatic hydrocarbons, phenols, and aromatic amines.

An object of this invention is to react an unsaturated organic compound in the presence of an ammonium phosphate catalyst to produce branched chain organic compounds.

Another object of this invention is to react a hydrocarbon material containing olefinic hydrocarbons in the presence of an ammonium phosphate catalyst to form branched chain hydrocarbons.

A further object of this invention is to effect isomerization and polymerization of olefinic hydrocarbons in the presence of an ammonium phosphate catalyst.

A still further object of this invention is to react an alkylatable aromatic compound with an olefin-acting compound in the presence of ammonium phosphate catalyst.

One specific embodiment of the present invention relates to a process for producing organic compounds of branched chain structures which comprises contacting a reactive organic compound at conversion conditions with an ammonium phosphate.

A further embodiment of this invention relates to a process which comprises reacting a hydrocarbon material containing an olefinic hydrocarbon in the presence of a catalyst comprising an ammonium phosphate as its essential active ingredient to form a more highly branched chain hydrocarbon than charged to the process.

Still another embodiment of this invention relates to a process for producing alkylated aromatic hydrocarbons which comprises reacting an alkylatable aromatic hydrocarbon and an olefin-acting compound at alkylating conditions in the presence of a catalyst comprising an ammonium phosphate.

Organic compounds utilizable as starting materials for my process comprise hydrocarbons, phenols, amines, etc. The hydrocarbons include both saturated and unsaturated hydrocarbons and particularly olefinic and aromatic hydrocarbons.

Olefinic hydrocarbons utilizable in this process comprise monoolefins having one double bond per molecule and polyolefins which have more than one double bond per molecule. Monoolefins which may be polymerized or be utilized for alkylating aromatic hydrocarbons and other aromatic compounds in the presence of an ammonium phosphate catalyst are either normally gaseous or normally liquid and include ethylene, propylene, butylenes, pentenes, and higher normally liquid olefins, the latter including various polymers of normally gaseous olefins. Cycloolefins, such as cyclopentene, cyclohexene, and various alkyl cycloolefins may also be used but generally not under exactly the same conditions of operation as employed with cycloolefins. Other unsaturated hydrocarbons used in the present process include conjugated diolefins such as butadiene and isoprene, non-conjugated diolefins, other polyolefinic hydrocarbons containing more than two double bonds per molecule, terpenic hydrocarbons, etc. Alkylating reactions may also be carried out using other olefin-acting compounds which include alcohols, ethers, and esters that are capable of undergoing dehydration or splitting to form olefinic hydrocarbons which may be considered to be present in the reaction mixture even though only as transient intermediate unsaturates which react further with the alkylatable hydrocarbons or other alkylatable compounds to produce the desired products. Alkyl halides, that is, monohaloalkanes, are also olefin-acting compounds and may be considered as esters of halogen acids. Thus olefinic hydrocarbons and various olefin-producing substances are herein referred to as olefin-acting compounds.

Aromatic hydrocarbons, such as benzene, toluene, other alkyl benzenes, naphthalene, alkyl naphthalenes, and other polynuclear aromatics which contain at least one replaceable nuclear hydrogen atom are alkylated by olefin-acting compounds, as herein set forth. These aromatic hydrocarbons may be obtained from any source such as by the distillation of coal, by the dehydrogenation of naphthenic hydrocarbons, by the cyclization of aliphatic hydrocarbons, and by other means.

Paraffinic hydrocarbons, particularly normally liquid paraffinic hydrocarbons, and various cycloparaffinic hydrocarbons, are also suitable charging stocks for hydrocarbon conversion reactions involving cracking. Some normally liquid olefins are also used as charging stocks for hydrogen transfer reactions to form a substantially saturated hydrocarbon product and a highly unsaturated relatively high boiling hydrocarbon material containing terpene-like hydrocarbons. At some conditions of operation, the long chain olefinic hydrocarbons also undergo depolymerization reactions, sometimes regarded as a form of cracking, to produce other olefinic hydrocarbons of lower molecular weight and also certain amounts of paraffinic, cycloolefinic and aromatic hydrocarbons.

Catalysts useful in promoting formation of more highly branched chain organic compounds from less-highly branched chain organic compounds comprise ammonium salts of phosphoric acids. These ammonium salts include both neutral and acid salts of ortho-, pyro-, tri-, tetra-, and other polyphosphoric acids, as such, in admixture with one another, and also supported on solid carriers, such as a silicious carrier as silica, diatomaceous earth, fullers earth, crushed porcelain, etc., and also alumina, charcoal and other packing materials, which do not interfere with the desired catalytic activity of an ammonium phosphate. Composites of an ammonium salt of an acid of phosphorus and a carrier, such as diatomaceous earth or some other siliceous material, are preferably calcined before being utilized as catalysts in conversion reactions of organic compounds and particularly of hydrocarbons. Such calcination is generally carried out at a temperature of about 200° to about 500° C.

According to the process of the present invention, an olefinic, naphthenic, or paraffinic hydrocarbon or a mixture of an olefinic hydrocarbon with an aromatic hydrocarbon or other aromatic compound may be reacted in the presence of the above indicated catalyst at a temperature of from about 150° C. to about 450° C. to produce organic compounds and particularly hydrocarbons of more highly branched chain structures than those of the hydrocarbon charged to the process. The exact temperature needed for a particular conversion reaction is generally best determined by experiments. Such treatment of an olefinic hydrocarbon having at least 4 carbon atoms per molecule effects an isomerization to produce hydrocarbons of substantially the same molecular weight but with a different structural arrangement of the carbon and hydrogen atoms present in the olefinic hydrocarbon charged to the process. Other treatments of olefinic hydrocarbons and particularly of gaseous olefinic hydrocarbons result in the formation of branched chain polymers, while certain catalytic treatments of high molecular weight olefins causes a depolymerization or cracking to form lower molecular weight olefinic hydrocarbons. Polymerization of olefins is preferably carried out at a temperature of from about 150° to about 350° C. while the higher temperatures of about 350° to about 450° C. are used in cracking, depolymerization, and hydrogen transfer reactions of olefins.

In carrying out the alkylation of aromatic compounds and particularly of aromatic hydrocarbons by olefin-acting compounds, an olefin-containing hydrocarbon fraction or other olefin-acting compound may be commingled with a recycled aromatic so that the ratio of alkylatable compound to olefin-acting compound in a total mixture charged to the alkylation zone is approximately 5:1. In some cases, this ratio may be as low as about 1:1 or as high as 10:1 or even 50:1, the exact ratio being dependent somewhat upon the particular alkylatable compound and olefinic hydrocarbon or olefin-acting material charged to the process.

Temperatures preferred for use in alkylation reactions are from about 150° to about 350° C. and the process is carried out at a pressure of from substantially atmospheric to about 200 atmospheres or more.

The process of the present invention is carried out in either batch or continuous types of operation. Thus in a simple batch type hydrocarbon conversion process, the hydrocarbon is brought to a reaction temperature as specified above in the presence of an ammonium phosphate or of a solid composite of an ammonium phosphate and a suitable carrier or supporting material, while the reaction mixture is stirred mechanically to effect intimate contact between the catalyst and the reactants. The presence of an excess of the alkylatable compound over the olefin or other olefin-acting compound favors the alkylation reaction and minimizes polymerization and destructive alkylation to lower boiling and higher boiling products. The olefinic hydrocarbon or other olefin-acting alkylating agent may be introduced at spaced points, throughout the reaction zone in order to assist in maintaining a high ratio of alkylatable compound to olefin through the entire reaction.

The resultant mixture of alkylation products and catalysts is removed periodically from the batch reactor and separated by suitable means and the used catalyst and unconverted alkylatable hydrocarbon are recycled to the process. One method of effecting this separation of the reaction products involves filtration to remove the catalyst from the hydrocarbons and fractional distillation of the hydrocarbons whereby unconverted alkylatable hydrocarbon material is vaporized and distilled from the higher boiling alkylation products. The recovered alkylatable hydrocarbon and catalyst may then be returned to the alkylation reaction zone for further use, while the alkylation product is fractionally distilled to separate desired fractions therefrom.

I prefer to carry out these hydrocarbon conversion reactions in a continuous manner. Thus in the alkylation of an aromatic hydrocarbon with an olefin in the presence of a solid catalyst, there is withdrawn from the alkylation reactor a mixture of alkylated hydrocarbons and unconverted alkylatable hydrocarbons. The alkylation may also be carried out by introducing hydrocarbon reactants and catalysts, the latter in finely divided form, to a coil or tower provided with baffles, orifice plates, or other mixing devices, or a vessel provided with a stirrer or other mechanical means of agitation, although any method may be employed that satisfactorily effects intimate contact of the reacting hydrocarbons and catalysts.

The various batch or continuous types of operation may be applied similarly to polymerization, isomerization, cracking, depolymerization, and hydrogen transfer reactions, using either finely divided catalyst or one or more fixed beds of a solid catalyst composite containing an ammonium phosphate as its essential active ingredient.

The amination of olefins, by which I mean the process of reacting an olefinic hydrocarbon with ammonia or a partially alkylated ammonia as a monoalkyl amine or a dialkyl amine to form an amine of higher molecular weight, is also carried out in the presence of my ammonium phosphate catalyst at a temperature of from about 150° to about 450° C. Also at these conditions of operation of an olefin-acting compound reacts with a phenol, a naphthol, or an aromatic amine to produce alkyl derivatives thereof.

The following examples are given to indicate results obtainable by the use of the present process, although they are not intended to limit the scope of the invention in exact correspondence therewith.

*Example I*

A butane-butylene fraction containing 10% isobutylene, 22% n-butylene and 68% of butanes is passed through a steel reactor containing diammonium phosphate, $(NH_4)_2HPO_4$, and diatomaceous earth maintained at a temperature of 275° C. the reactor being under a pressure of 45 atmospheres. The isobutylene and about half of the n-butylenes are polymerized to a liquid polymer containing 70% by volume of octenes.

*Example II*

A mixture of 30% 1-butylene and 70% n-butane is contacted with a triammonium phosphate-diatomaceous earth composite at 300° C. and atmospheric pressure. When using average contact time of from 2 to 30 seconds, a butane-butylene mixture is recovered containing 70% butane and 30% normal butylenes, more than half of the latter being 2-butylene.

*Example III*

A mixture of one molecular proportion of n-pentenes and one molecular proportion of benzene is added with stirring during 0.5 hour to an autoclave containing 3 molecular proportions of benzene, 0.5 molecular proportion of monoammonium phosphate and 0.5 molecular proportion of ammonium pyrophosphate maintained at a temperature of 325° C. and at a pressure of 20 atmospheres. The hydrocarbon mixture after separation from the used ammonium phosphate catalyst mixture, is then fractionally distilled to separate unconverted benzene from the monoamyl benzene and polyamyl benzenes formed.

*Example IV*

A mixture of butene trimers and tetramers is passed at atmospheric pressure and at an hourly liquid space velocity of one through a reactor containing a granular composite of ammonium phosphate and crushed porcelain maintained at a temperature of 400° C. The butene trimers and tetramers undergo depolymerization or cracking to form about 35% per pass of hydrocarbons boiling below 175° C. and consisting of a mixture of paraffins, olefins, and cyclic hydrocarbons, the latter including cyclic olefins. The higher boiling reaction products contain some aromatic hydrocarbons.

The character of the process of the present invention is evident from the preceding specification and examples, although these are not introduced with the intention of limiting unduly the broad scope of the invention.

I claim as my invention:

1. A process for producing hydrocarbons of higher molecular weight than that of a hydrocarbon starting material containing olefinic hydrocarbons which comprise reacting said hydrocarbon material at a temperature of from about 150° to about 450° C. in contact with a catalyst comprising an ammonium phosphate as its essential active ingredient.

2. An alkylation process which comprises reacting an alkylatable hydrocarbon and an olefinic-acting compound at a temperature of from about 150° to about 450° C. in contact with a catalyst comprising an ammonium phosphate as its essential active ingredient.

3. An alkylation process which comprises reacting an alkylatable hydrocarbon and an unsaturated hydrocarbon at a temperature of from about 150° to about 450° C. in contact with a catalyst comprising an ammonium phosphate as its essential active ingredient.

4. An alkylation process which comprises reacting an alkylatable aromatic compound and an olefinic hydrocarbon at a temperature of from about 150° to about 450° C. in contact with a catalyst comprising an ammonium phosphate as its essential active ingredient.

5. An alkylation process which comprises reacting an alkylatable aromatic hydrocarbon and an olefinic hydrocarbon at a temperature of from about 150° to about 450° C. in contact with a catalyst comprising an ammonium phosphate as its essential active ingredient.

6. A process for producing hydrocarbons of higher molecular weight than that of a hydrocarbon starting material containing olefinic hydrocarbons which comprise reacting said hydrocarbon material at a temperature of from about 150° to about 450° C. in contact with a composite comprising essentially an ammonium phosphate and a solid carrier.

7. An alkylation process which comprises reacting an alkylatable hydrocarbon and an olefin-acting compound at a temperature of from about 150° to about 450° C. in contact with a composite comprising essentially an ammonium phosphate and a solid carrier.

8. A process for polymerizing olefinic hydrocarbons which comprises reacting said olefinic hydrocarbons in contact with a catalyst comprising an ammonium phosphate as its essential active ingredient at a temperature of from about 150° to about 450° C. and at a pressure of from substantially atmospheric to about 200 atmospheres.

9. A process for polymerizing olefinic hydrocarbons which comprises reacting said o'efinic hydrocarbons in contact with a catalyst comprising an ammonium phosphate as its essential active ingredient at a temperature of from about 150° to about 350° C.

10. A process for polymerizing monoolefin hydrocarbons which comprises reacting a monoolefin hydrocarbon in contact with a catalyst comprising an ammonium phosphate as its essential active ingredient at a temperature of from about 150° to about 450° C. and at a pressure of from substantially atmospheric to about 200 atmospheres.

11. A process for polymerizing monoolefin hydrocarbons which comprises reacting a monoolefin hydrocarbon at a temperature of from about 150° to about 350° C. in contact with a catalyst comprising an ammonium phosphate as its essential active ingredient.

12. An alkylation process which comprises reacting an alkylatable hydrocarbon and an olefin-acting compound at a temperature of from about 150° to about 350° C. and at a pressure of from substantially atmospheric to about 200 atmospheres in contact with a composite comprising essentially an ammonium phosphate and a solid carrier.

13. An alkylation process which comprises reacting an olefinic hydrocarbon and a benzene hydrocarbon containing at least one replaceable nuclear hydrogen atom at a temperature of from about 150° to about 450° C. in contact with a catalyst comprising an ammonium phosphate as its essential active ingredient.

14. An alkylation process which comprises reacting benzene and an olefinic hydrocarbon at a temperature of from about 150° to about 450° C. in contact with a catalyst comprising an ammonium phosphate as its essential active ingredient.

15. A polymerization process which comprises reacting a normally gaseous olefin at a temperature of from about 150° to about 350° C. in contact with a catalyst comprising an ammonium phosphate as its essential active ingredient.

16. A polymerization process which comprises reacting a butylene at a temperature of from about 150° to about 350° C. in contact with a catalyst comprising an ammonium phosphate as its essential active ingredient.

RAYMOND E. SCHAAD.

REFERENCES CITED

The following references are of record in the file of this patent:

UNITED STATES PATENTS

| Number | Name | Date |
|---|---|---|
| 2,371,530 | Lorch | Mar. 13, 1945 |

OTHER REFERENCES

Industrial and Engineering Chemistry, 1929, 21, 286.